Patented July 18, 1950

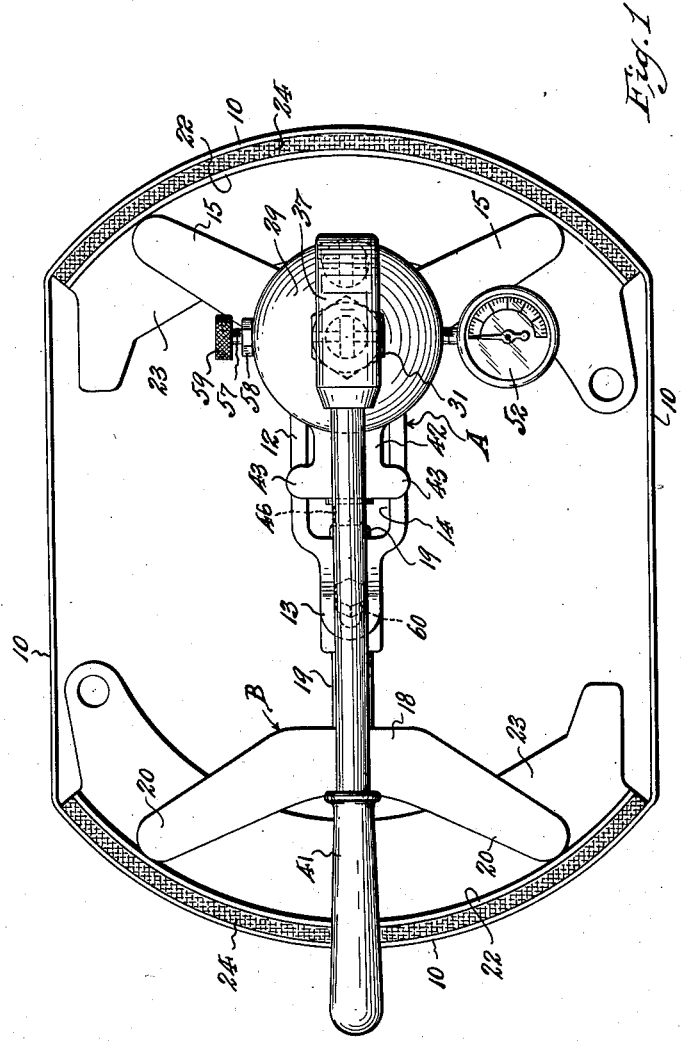

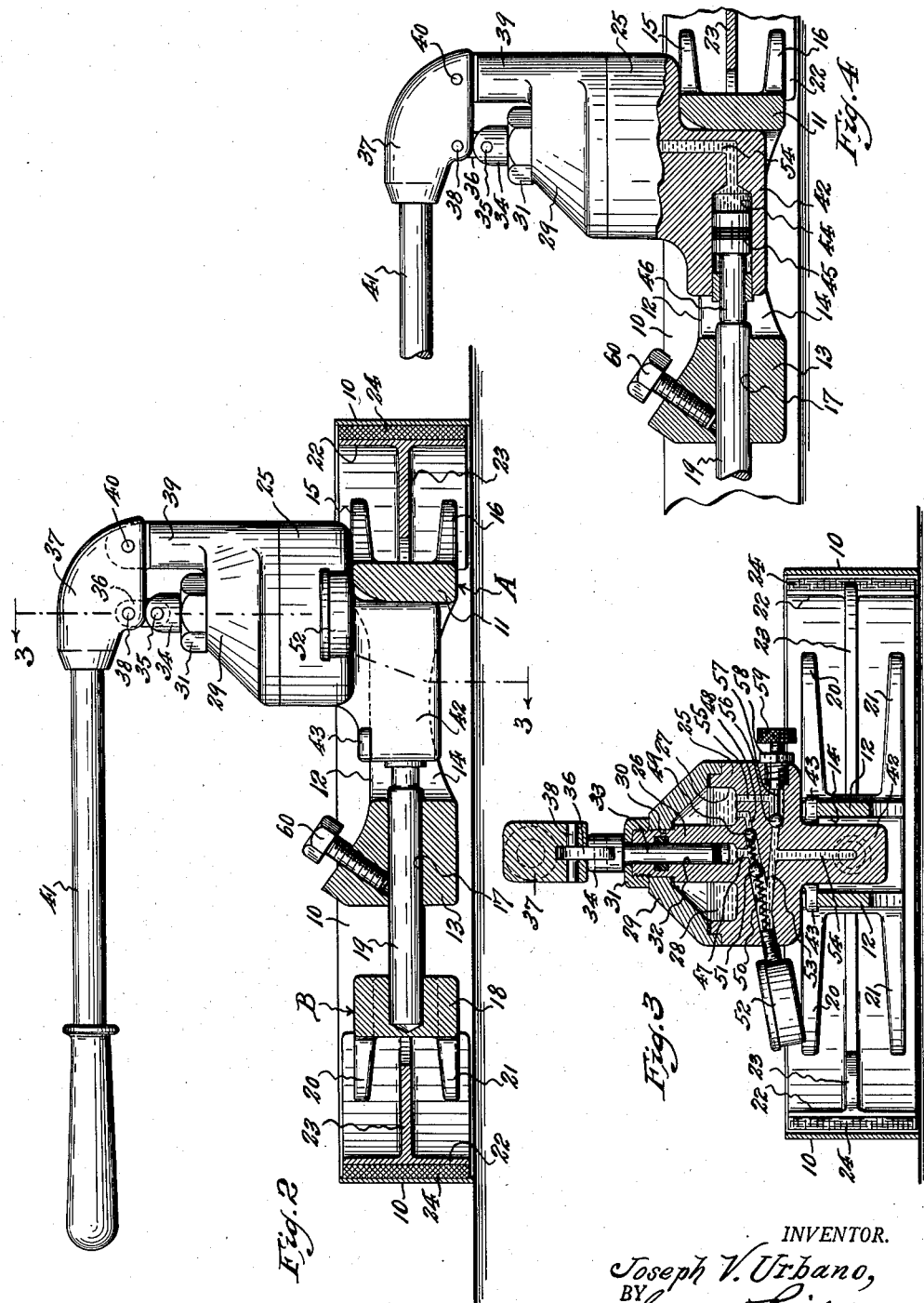

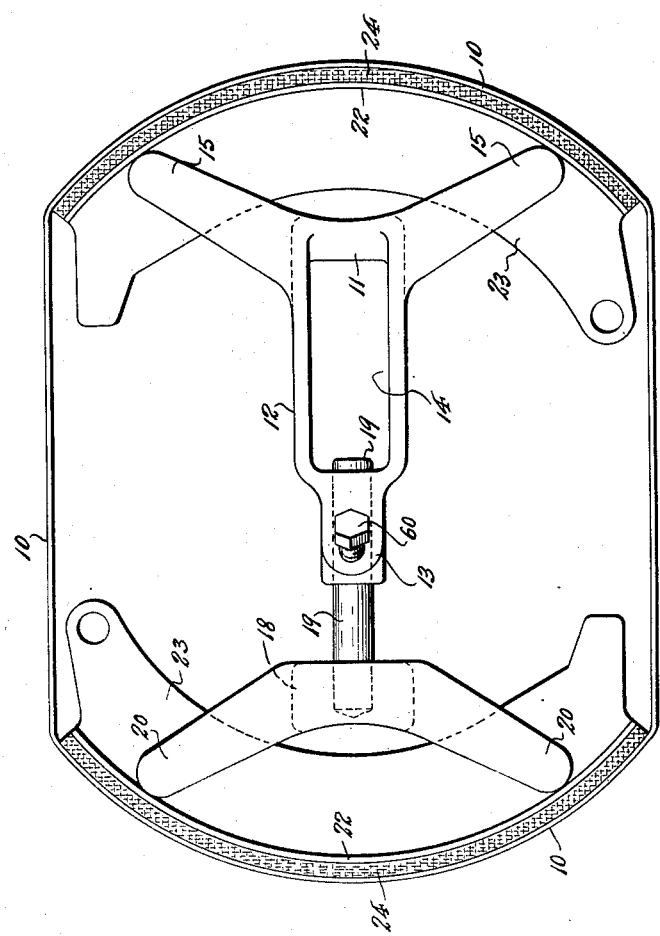

2,515,746

UNITED STATES PATENT OFFICE 2,515,746

CLAMP MECHANISM FOR SETTING ADHE-
SIVELY BOUND BRAKE SHOE LININGS

Joseph V. Urbano, Newark, N. J.

Application November 25, 1949, Serial No. 129,254

10 Claims. (Cl. 154—1)

This invention relates to a clamp device and actuating means therefor for use in setting adhesively bound linings to brake shoes.

To a large extent the practice of adhesively bonding linings to the circumferential faces of brake shoes, such e. g. as used in automotive vehicles, has replaced the prior riveting method.

In the practice of adhesively bonding a lining to the face of a brake shoe band, a suitable thermo setting adhesive is applied between the meeting faces of the lining and the brake shoe band, and while the lining and brake shoe are firmly held together by application of strong, unyielding pressure thereto, the assembly is subjected to heat, as e. g. by deposit in a baking oven, whereby to set the adhesive, and thus effect a strong bonding of the lining to the brake shoe band.

In such practice, in order to assure tight and uniform meeting of the faces of the lining and brake shoe band throughout the area thereof, it is necessary to provide clamping means capable of applying pressure upon the assembly ranging from 1500 to 3000 pounds, and maintaining such pressure without relaxation during the baking operation by which the adhesive is set, whereby to assure a uniform and strong bond free from voids, blisters or non-adhered areas. The application and maintenance of such pressure without risk of injury to the brake shoe, or of buckling or deformation of the brake shoe rib or flange, has not been satisfactorily carried out by clamping means heretofore employed.

Having the above in view, it is an object of this invention to provide a novel construction of holding clamp means operative upon a brake shoe and lining assembly provided with intermediate applications of thermo setting adhesive substance, together with means cooperative with said clamp means for applying required compressive pressure to the assembly, said pressure applying means being removable from the clamp means, and said clamp means including means to releasably lock the same against relaxation of applied pressure after the pressure applying means is removed.

A further object of the invention is to provide a clamp structure and actuating means therefor, said clamp structure comprising an endless flexible clamp band and a pair of cooperative oppositely extending pressure transmission devices adapted to be disposed intermediate two brake shoe and lining assemblies which are embraced by said clamp band; said devices including spreader portions adapted to straddle the ribs or flanges of the brake shoes respectively engaged thereby, so as to directly engage the brake bands at a plurality of spaced points, whereby to distribute the thrusting force of the devices with balanced equalized effect without risk of injury to or deformation of either the brake bands or the ribs or flanges of said brake shoes; and said actuating means comprising a novel hydraulic jack device adapted to be removably engaged with the pressure transmission devices and being operative to exert oppositely directed thrusting force upon the latter; said pressure transmission devices having means to interlock the same together against relaxation of the clamping pressure thus applied thereto by the hydraulic jack device.

Other objects of this invention, not at this time more particularly enumerated, will be understood from the following detailed description of the same.

An illustrative embodiment of the invention is shown in the accompanying drawings, in which:

Fig. 1 is a top plan view of the clamp structure as operatively applied to brake shoe and lining assemblies, and with the hydraulic jack device disposed in operative relation to the clamping spreaders of the clamp structure; Fig. 2 is a central longitudinal vertical section through the clamp structure and brake shoe and lining assemblies, with the applied hydraulic jack device shown in elevation; Fig. 3 is a transverse vertical section, taken on line 3—3 in Fig. 2; Fig. 4 is a fragmentary central longitudinal vertical section similar to that of Fig. 2, the hydraulic jack device being shown in part section; and Fig. 5 is a top plan view of the clamp structure as applied to the brake shoe and lining assemblies in holding relation thereto, after the hydraulic jack device has been removed.

Similar characters of reference are employed in the above described views, to indicate corresponding parts.

Referring to the drawings, the clamp structure comprises an endless clamp band 10 of suitable dimensions, which is preferably made from tough, flexible strip steel. The width of the band strip approximates the width of the brake shoes desired to be operated upon by the clamp structure, being preferably somewhat in excess thereof. Adapted for insertion within and to extend diametrically across the interior of the clamp band 10 is a pair of cooperative oppositely extending pressure transmission devices A and B. Said devices A and B are longitudinally aligned and telescopically joined for relative extension movement.

The pressure transmission device A comprises a body 11 which is provided with an inwardly extending longitudinal frame 12 terminating at its free end in a head piece 13. Said frame 12 is provided with an opening 14 which extends intermediate its sides between the body 11 and the head piece 13. Integral with the body 11 of device A, to extend divergently outward therefrom, are upper spreader arms 15 and lower spreader arms 16; said spreader arms 15 and 16 being thus disposed in vertically spaced apart parallel planes. The head piece 13 is provided with a central longitudinal bore or slideway opening 17 which extends therethrough into communication with the frame opening 14.

The pressure transmission device B also comprises a body 18. Affixed to said body 18, to extend inwardly therefrom, in central longitudinal or axial alignment with the pressure transmission device A, is a thrust bar 19. The free end portion of the thrust bar 19 passes slidably through the bore or slideway opening 17 of the head piece 13 of said pressure transmission device A, and into the frame opening 14 of the latter, thus telescopically joining the devices A and B for relative extension movement. Integral with the body 18 of the pressure transmission device B, to extend divergently outward therefrom, are upper spreader arms 20 and lower spreader arms 21; said spreader arms 20 and 21 being thus disposed in vertically spaced apart parallel planes.

The clamp structure of this invention is designed to operate upon brake shoes of the type comprising an arcuate brake band 22 having an integral rib or flange 23 which projects from the back or inner face thereof and perpendicular thereto. Such brake shoes are provided on the outer faces of their brake bands 22 with a frictional lining 24 for cooperation with the braking surface of the brake drum of a brake mechanism. As above stated, it is the better practice to adhesively secure the lining 24 to the brake band 22, so as to avoid necessity for the use of rivets or like mechanical fasteners, which, when the lining wears, are likely to be exposed and to then make detrimental scoring contact with the brake drum surface. The adhesive substance most commonly used is a thermo-setting adhesive which must be hardened by influence of heat, usually in the range of 450° to 550° F. Initially, therefore, the lining 24 is applied to the brake band 22 with an intermediate application of the thermo-setting adhesive, and the assembly must be subjected to strong binding pressure of from 1500 to 3000 pounds, and so held under such pressure during subjection of the assembly to setting heat (as in a baking oven) until the adhesive is set. The applied and maintained pressure assures complete, intimate and uniform meeting of the brake band and lining surfaces in such manner that all air is expelled from between these surfaces, and all voids, blisters or non-adhered areas entirely eliminated. It is the function of the clamp structure and actuating means therefor of this invention to both apply and hold the treated brake shoe and lining assemblies under the required pressure until the lining attaching adhesive has become firmly hardened or set.

The clamp structure is adapted to operatively embrace and hold a pair of brake shoe and lining assemblies. To this end, one assembly, having a joining application of adhesive between its brake band and lining, is inserted within the clamp band 10 to oppose the lining to one end of the latter, and the other adhesive treated assembly is likewise inserted to oppose its lining to the opposite end of said clamp band.

The brake shoe and lining assemblies having been thus mounted in the clamp band 10, the telescopically joined pressure transmission devices A and B are longitudinally contracted and then inserted to extend between the clamp band embraced brake shoe and lining assemblies. Said devices A and B are thereupon manually extended to bring the upper and lower spreader arms 15 and 16 of the device A into straddling relation to the rib of flange 23 of one said brake shoe and lining assembly, with the extremities of said spreader arms 15 and 16 bearing against the back or inner face of the brake band of said assembly; and, in like manner, to bring the upper and lower spreader arms 20 and 21 of the device B into straddling relation to the rib or flange 23 of the opposite brake shoe and lining assembly, with the extremities thereof bearing against the back or inner face of said latter assembly.

The brake shoe and lining assemblies having been thus operatively engaged by the clamp structure, novel means for actuating the pressure transmission devices A and B, which is operative to extend the latter and thus cause the same to forcefully thrust against and compress the brake shoe and lining assemblies between said devices and the surrounding clamp band 10, is applied to the clamp structure. This actuating means comprises a novel hydraulic jack mechanism. The novel hydraulic jack mechanism comprises a body member 25 which is provided, in connection with its upper portion, with an upstanding, axially extending pump cylinder 26. The upper end portion of the body member 25 is internally formed to provide an annular reservoir 27 surrounding the pump cylinder, said reservoir being adapted to contain a supply of operating fluid, such e. g. as a suitable oil 28. The body member 25 is provided with a cover member 29 to close the reservoir 27; said cover member having an opening 30 through which the pump cylinder 26 extends. The cover member is secured in place by a keeper nut 31 which is screwed onto the externally threaded end portion of the pump cylinder 26. Entered in the bore 32 of the pump cylinder 26 is a pump plunger 33. Said pump plunger is provided at its upper exterior end with a bifurcate coupling portion 34 to which is pivotally connected, by wrist pin 35, one end of a link 36. The other end of link 36 is pivotally connected to a pump lever 37 by a cross pin 38. Rising from the cover member 29 is a fulcrum post 39 to which the pump lever is pivoted by another cross-pin 40. The pump lever 37 is provided with a forwardly extending handle arm 41. Formed as an integral part of the body member 25, to depend from the bottom thereof, is a forwardly offset extension or housing 42, the same being of such reduced width as to permit of its insertion into the frame opening 14 of the pressure transmission device A, when the body member 25 is operatively seated upon the body 11 of said device A. When the body member 25 is so seated upon the pressure transmission device A, the rearward end of said extension or housing 42 will abut the body 11 of said device A so as to thrust thereagainst. To stabilize the body member 25 when seated upon the body 11 of the pressure transmission device A, whereby said body member 25 is held against displacement from the latter during operation of the hydraulic jack mechanism, as will be hereinafter described, the extension or housing 42 is provided, at the upper level of its forward end portion, with laterally and oppositely extending footing lugs 43 which respectively rest upon the tops of the opposite side walls of the frame 12 of said pressure transmission device A.

The extension or housing 42 of the body member 25 of the hydraulic jack mechanism is provided with a cylinder bore 44. Slidably movable in said cylinder bore 44 is a piston 45 having an outwardly projecting jack plunger 46, which, when the body member 25 and its extension or housing 42 is operatively supported upon the pressure transmission device A, is longitudinally aligned with and opposed to the thrust bar 19 of the pressure transmission device B. Formed in the body member 25 is a system of hydraulic fluid circulating passages which intercommunicate with the pump cylinder 26, reservoir 27 and cylinder bore 44 of the hydraulic jack plunger means (see Figs. 3 and 4). These passages include a port 47 which communicates with the lower or inner end of the pump cylinder 26. Leading from the reservoir 27 to said port 47 is a fluid supply passage 48 which includes a spring closed check valve 49 that opens toward the port 47. Leading from the port 47 is a branch 50 of a pumped fluid delivery passage which includes an outwardly opening spring closed check valve 51. Connected with the body member 25, in communication with the outer end of said branch 50 of the pumped fluid delivery passage is an external fluid pressure indicating gauge 52. Leading from the branch 50 of the fluid delivery passage is a branch 53 thereof which communicates with a flow passage 54 through which the pumped fluid is delivered to and from the cylinder bore 44 of the hydraulic jack plunger means. From the flow passage 54 extends a fluid return passage 55 which leads back to the reservoir 27. This return passage 55 includes a manually operated stop valve 56, the control stem 57 of which is threaded through a bushing 58 mounted in the body member 25; said stem terminating at its external end in a finger piece 59 by which the stop valve means can be manipulated.

In the operation of the clamp structure, after the adhesively treated brake shoe and lining assemblies have been deposited within the embrace of the clamp 10, and the pressure transmission devices A and B have been operatively assembled and arranged to extend between the clamp band embraced brake shoe and lining assemblies, the hydraulic jack actuator is mounted on the pressure transmission device A so that its housing 42 abuts the body 11 of the latter, with its jack plunger 46 aligned with and opposed to the thrust bar 19 of the pressure transmission device B (see Figs. 1 and 2).

Preparatory to actuating the hydraulic jack, the stop valve 56 is closed by inturning the control stem 57, thus closing the return passage 55 against flow of operating fluid back to the reservoir 27. When the hydraulic jack actuator is in place and thus conditioned for operation, the operator, by means of the pump lever 37—41, causes the pump plunger 33 to be reciprocated in the pump cylinder 26. On its suction stroke, said pump plunger draws operating fluid into the pump cylinder from the reservoir 27 through the supply passage 48; the check valve 49 opening to the flow. On such suction stroke of pump plunger 33, the check valve 51 closes against back flow of operating fluid through the delivery passages 50, 53 and 54.

On the force stroke of the pump plunger 33, the check valve 49 closes against back flow of operating fluid to the reservoir 27 through the supply passage 48, but check valve 51 opens to flow of fluid through the passages 50, 53 and 54 to the cylinder bore 44 of the hydraulic jack plunger means. Under the thrust of the fluid thus delivered to the cylinder bore 44, the piston 45 and jack plunger 46 are outwardly projected and forcibly thrust against the thrust bar 19 of the pressure transmission device B, and at the same time housing 42 exerts outward thrust upon the pressure transmission device A. Under continued pumping operation of the hydraulic jack actuator, the pressure transmission devices A and B are forcibly relatively moved in opposite directions, thereby exerting great pressure upon the brake shoe and lining assemblies, whereby the adhesively treated linings of said assemblies are forcibly compressed between the clamp band 10 and the brake bands 22, so as to cause intimate meeting of the linings and the brake bands free from non-contacting areas. The clamping pressure thus applied is built up to the desired quantum of from 1500 to 3000 pounds, the gauge 52 indicating when the desired pressure is attained. Upon attainment of desired pressure, the devices A and B are locked against relaxation or release of the applied pressure, and for this purpose the head piece 13 of pressure transmission device A is provided with a lock screw 60 which, when inturned, binds against the thrust bar 19 of pressure transmission device B so as to prevent retraction of the latter relative to pressure transmission device A.

After the brake shoe and lining assemblies are held under pressure in the clamp structure, the hydraulic jack means is removed from the latter. Preparatory to such removal, the stem 57 of the stop valve 56 is retracted to permit the stop valve to open for passage of operating fluid from the cylinder bore 44 back to the reservoir 27 through the return passage 55.

After the hydraulic jack means is removed from the locked clamp structure, the brake shoe and lining assemblies as held under pressure by the latter, may be deposited in a baking oven or subjected to other suitable heat applying means whereby the thermo-setting adhesive between the brake shoe bands and linings is caused to harden and set. Upon completion of the heat treatment, the clamp structure can be quickly removed from the brake shoe and lining assemblies by releasing the lock screw 60 and retracting the pressure transmission devices A and B, whereafter the clamp structure is available for repeated use.

Having described my invention, I claim:

1. A clamping apparatus comprising an endless clamp band adapted to receive, respectively within opposite ends thereof, brake shoes having linings applied to their brake band faces by adhesive substance, a pair of longitudinally aligned pressure transmission devices disposed between said brake shoes, one said device including an open frame terminating at its inner end in a head piece having an axial bore, the other said device having a thrust bar slidably extending through the bore of the head piece of said first mentioned device into the frame interior thereof, a hydraulic jack means removably engageable with said first mentioned device, said hydraulic jack means having a jack plunger adapted to be aligned with and opposed to the thrust bar of said second mentioned device, the hydraulic jack means being operative to relatively extend said devices whereby to exert binding pressure upon the brake shoe and lining assemblies, and a lock screw threaded through the head piece of said first mentioned device and manipulatable to engage said thrust bar of the second mentioned device when said devices are extended, whereby to hold said devices in binding pressure transmitting relation to the brake shoe and lining assemblies after the hydraulic jack means is removed therefrom.

2. A clamping structure as defined in claim 1 wherein each pressure transmission device is provided with a plurality of spreader arms projecting from its outer end to abut the brake shoe bands at a plurality of points symmetrically offset relative to the longitudinal axes of said devices and in straddling relation to the brake shoe ribs.

3. A clamping structure as defined in claim 1 wherein the hydraulic jack means comprises a body member having a manipulatable pump means, an operating fluid reservoir and a cylinder for the jack plunger; and said body member being further provided with a check valve controlled fluid supply passage leading from said reservoir to the pump means, a check valve controlled pumped fluid passage extending between the pump means and the jack plunger cylinder, and a manipulatable stop valve controlled fluid return passage extending between the jack plunger cylinder and said reservoir.

4. A clamping structure as defined in claim 1 wherein the hydraulic jack means comprises a body member having a manipulatable pump means, an operating fluid reservoir and a cylinder for the jack plunger; said body member being further provided with a check valve controlled fluid supply passage leading from said reservoir to the pump means, a check valve controlled pumped fluid passage extending between the pump means and the jack plunger cylinder, and a manipulatable stop valve controlled fluid return passage extending between the jack plunger cylinder and said reservoir; and a pressure indicating gauge mounted on said body member in communication with the pumped fluid delivery passage.

5. A clamping apparatus comprising an endless clamp band adapted to receive, respectively within opposite ends thereof, brake shoes having linings applied to their brake band faces by adhesive substance, a pair of longitudinally aligned pressure transmission devices disposed between said brake shoes, each said device being provided with a plurality of spreader arms projecting from their outer ends to abut the brake shoe bands at a plurality of points symmetrically offset relative to the longitudinal axes of said devices and in straddling relation to the brake shoe ribs, one said device including an open frame terminating in a head piece having an axial bore, the other said device having a thrust bar slidably extending through the bore of the head piece of said first mentioned device into the frame interior thereof, a hydraulic jack means comprising a body member adapted to be removably supported upon said first mentioned device and having an extension to depend therefrom into the frame interior of the latter, said extension having a cylinder bore, a jack plunger projectible from said cylinder bore, said jack plunger being adapted to be aligned with and opposed to the thrust bar of said second mentioned device, said body member having a manipulatable pump means and an operating fluid reservoir, said body member being further provided with a check valve controlled fluid supply passage leading from said reservoir to the pump means, a check valve controlled pumped fluid pasage extending between the pump means and the jack plunger cylinder bore, and a manipulatable stop valve controlled fluid return passage extending between the jack plunger cylinder bore and said reservoir, operation of said hydraulic jack means being adapted to extend said pressure transmission devices whereby to exert binding pressure upon the brake shoe and lining assemblies, and a lock screw threaded through the head piece of said first mentioned pressure transmission device for engagement with the thrust bar of said second pressure transmission device, whereby to hold said devices in binding pressure transmitting relation to the brake shoe and lining assemblies after the hydraulic jack means is removed therefrom.

6. A clamping apparatus as defined in claim 5, including a pressure indicating gauge mounted on the body member of the hydraulic jack means in communication with the pumped fluid delivery passage thereof.

7. A clamping apparatus comprising an endless clamp band adapted to receive, respectively within opposite ends thereof, brake shoes having linings applied to their brake band faces by adhesive substance, a pair of longitudinally aligned pressure transmission devices disposed between said brake shoes, one said device including an open frame terminating at its inner end in a head piece having an axial bore, the other said device having a thrust bar slidably extending through the bore of the head piece of said first mentioned device into the frame interior thereof, a hydraulic jack means removably engageable with said first mentioned device, said hydraulic jack means having a jack plunger adapted to be aligned with and opposed to the thrust bar of said second mentioned device, the hydraulic jack means being operative to relatively extend said devices whereby to exert binding pressure upon the brake shoe and lining assemblies, and releaseable means carried by one pressure transmission device for cooperation with the other pressure transmission device operative to lock the extended pressure transmission devices together whereby to hold the same in binding pressure transmitting relation to the brake shoe and lining assemblies after said hydraulic jack means is removed therefrom.

8. A clamping structure as defined in claim 7 wherein the hydraulic jack means comprises a body member having a manipulatable pump means, an operating fluid reservoir and a cylinder for the jack plunger; and said body member being further provided with check valve controlled fluid passages for circulation of fluid between the pump means and jack plunger cylinder from and to the reservoir, and a manipulatable stop valve means to prevent return of fluid from the jack plunger cylinder to the reservoir during operation of the pump means.

9. A clamping structure as defined in claim 8 including a pressure indicating means mounted on the body member of the hydraulic jack in the path of fluid impelled by the pump means to the jack plunger cylinder.

10. A clamping structure as defined in claim 7 wherein each pressure transmitting device is provided with a plurality of spreader arms projecting from its outer end to abut the brake shoe bands at a plurality of points symmetrically offset relative to the longitudinal axes of said devices and in straddling relation to the brake shoe ribs.

JOSEPH V. URBANO.

REFERENCES CITED

The following references are of record in the file of this patent:

UNITED STATES PATENTS

| Number | Name | Date |
| --- | --- | --- |
| 2,016,093 | Knight | Oct. 1, 1935 |
| 2,358,483 | Tilden | Sept. 10, 1944 |